United States Patent
Klein et al.

(10) Patent No.: US 8,149,086 B2
(45) Date of Patent: Apr. 3, 2012

(54) SECURITY SYSTEMS AND METHODS RELATING TO TRAVELLING VEHICLES

(75) Inventors: Dan Klein, Har Adar (IL); Relu Rosenberg, Haifa (IL)

(73) Assignee: Elbit Systems Ltd., Haifa (IL)

( * ) Notice: Subject to any disclaimer, the term of this patent is extended or adjusted under 35 U.S.C. 154(b) by 1208 days.

(21) Appl. No.: 11/631,095

(22) PCT Filed: Jun. 20, 2005

(86) PCT No.: PCT/IL2005/000657
§ 371 (c)(1),
(2), (4) Date: Oct. 12, 2007

(87) PCT Pub. No.: WO2006/001004
PCT Pub. Date: Jan. 5, 2006

(65) Prior Publication Data
US 2009/0189734 A1   Jul. 30, 2009

(30) Foreign Application Priority Data
Jun. 29, 2004   (IL) .......................................... 162779

(51) Int. Cl.
*G08B 29/00* (2006.01)
*G05B 19/00* (2006.01)
*G01S 13/08* (2006.01)
*G06K 5/00* (2006.01)
*G01C 23/00* (2006.01)
*G06Q 20/00* (2012.01)

(52) U.S. Cl. ........ 340/5.51; 340/5.1; 340/5.2; 340/5.52; 340/5.54; 340/5.8; 340/5.81; 340/5.82; 342/41; 342/51; 342/29; 342/36; 342/398; 235/380; 235/382; 235/382.5; 701/3; 701/11; 701/301; 701/14; 701/120; 705/64

(58) Field of Classification Search .................... 340/5.1, 340/5.2, 5.51–5.54, 5.8–5.85, 945, 426.12, 340/426.18, 901, 905, 907, 961, 963–965, 340/971, 973, 974, 979, 983, 995.12, 995.24, 340/995.25, 995.27, 988; 342/41–51, 29, 342/36, 398; 235/380, 382, 382.5; 705/64; 701/3, 11, 301, 14, 120
See application file for complete search history.

(56) References Cited

U.S. PATENT DOCUMENTS 4,720,860 A * 1/1988 Weiss ........................... 713/184
(Continued)

OTHER PUBLICATIONS

"Security Protection Through Secondary Alert Passwords", IBM Technical Disclosure Bulletin, vol. 38, No. 10, pp. 591-592, 1995.

*Primary Examiner* — Daniel Wu
*Assistant Examiner* — Mancil Littlejohn
(74) *Attorney, Agent, or Firm* — Oblon, Spivak, McClelland, Maier & Neustadt, L.L.P.

(57) ABSTRACT

There is provided a method for identifying, at the moment of verification, the situation of a threat to a protected ground, airspace and/or sea limits by an approaching ground vehicle, aircraft or sea-going vessel. The method includes an authorized driver/pilot/captain to select first state in which the vehicle, aircraft or sea-going vessel is not considered to present a threat and a second state in which the vehicle, aircraft or sea-going vessel is considered to present a threat. The method further provides entering the first and second PIN codes into a smart card for generating a One Time Indicia (OTI) for each of the PIN codes and disclosing the state associated with each of the first and second OTI codes to at least one control center. Upon the control center receiving an OTI code, the control center obtains positive identification of the driver/pilot/captain and the degree of the threat that the vehicle, aircraft or sea-going vessel presents.

10 Claims, 1 Drawing Sheet

U.S. PATENT DOCUMENTS

| | | | |
|---|---|---|---|
| 5,354,974 A | 10/1994 | Eisenberg et al. | |
| 6,011,858 A * | 1/2000 | Stock et al. | 382/115 |
| 6,094,486 A * | 7/2000 | Marchant | 380/52 |
| 6,526,337 B2 * | 2/2003 | Gardner | 701/3 |
| 6,641,087 B1 * | 11/2003 | Nelson | 244/118.5 |
| 6,658,572 B1 * | 12/2003 | Craig | 726/16 |
| 6,675,095 B1 | 1/2004 | Bird et al. | |
| 6,958,676 B1 * | 10/2005 | Morgan et al. | 340/5.72 |
| 7,225,976 B1 * | 6/2007 | Moberg | 235/380 |
| 7,898,385 B2 * | 3/2011 | Kocher | 340/5.52 |
| 2004/0056770 A1 * | 3/2004 | Metcalf | 340/574 |
| 2004/0078118 A1 | 4/2004 | Binder | |
| 2004/0264743 A1 * | 12/2004 | Arnouse | 382/116 |

\* cited by examiner

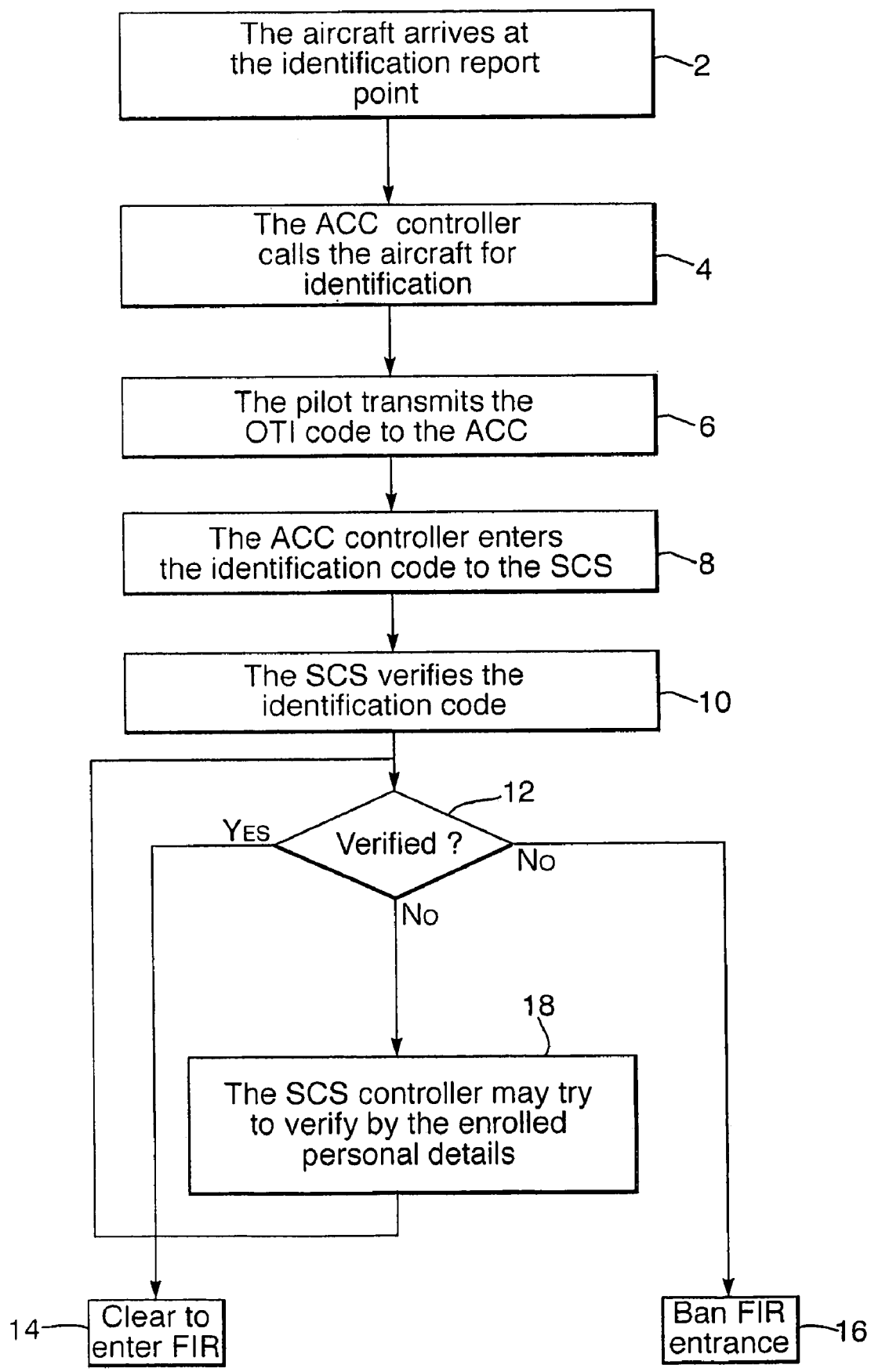

SECURITY SYSTEMS AND METHODS RELATING TO TRAVELLING VEHICLES

FIELD OF THE INVENTION

The present invention relates to security systems and methods, and more particularly, to security methods for identifying, at the moment of verification, the situation of a threat from a land vehicle, a flying aircraft or a sea-going vessel.

The invention also concerns a method for verifying the identity of the driver of the vehicle, the pilot flying the aircraft or the captain of a sea-going vessel, by comparison with the information stored in a control center, e.g., a pre-flight schedule.

BACKGROUND OF THE INVENTION

Access control, both on the ground and in the air, has become a high priority issue dealt with by many, with a view to improving existing security systems and methods. While basically, the use of technological means for assisting in determination of authorization to enter a protected premises or air space is known, methods of employing same for remote identification and authentication are more problematic. This is amplified many-fold where identification and authorization to access ground and/or air space should be carried out on-line and without delay, e.g., in the case of an aircraft approaching the protected airspace.

U.S. Pat. No. 6,675,095 discloses a tamper-resistant apparatus located on board of an aircraft for avoiding a restricted air space (RAS) whose coordinates are stored in a secure database; and a navigational processor configured to navigate the aircraft around the RAS, if a valid overriding command is not generated. The navigational processor is configured to navigate the aircraft in an overriding mode, if the valid overriding command is generated.

IBM Technical Disclosure Bulletin vol. 38, no. 10, pp. 591-591 titled "*Security protection through secondary alert passwords*" discloses the use of a secondary alert password provided to authorized users to identify illegitimate access attempts of electronically protected resources.

SUMMARY OF THE INVENTION

It is therefore a broad object of the present invention is to provide a method for identifying the situation of a threat to a protected ground and/or air space by an approaching vehicle, aircraft or sea-going vessel.

It is a further object of the present invention to provide a method for verifying the identification of the driver of the vehicle, the pilot actually flying the aircraft and/or a captain of a sea-going vessel.

It is a still further object of the present invention to protect a ground and/or air space by reducing the danger that a threatened driver, pilot or captain will unintentionally divulge the code granting permission to access the protected space.

It is a further object of the invention to provide a method for the protection of ground, airspace and/or off-shore sea limits against unauthorized intruders, without the persons threatening the driver, pilot or captain being aware that their scheme has been exposed.

The term "threat" as used herein is meant to define a situation where the entry or arrival of a ground, air vehicle or sea-going vessel at its destination may endanger the protected space.

In accordance with the invention, there is therefore provided a method for providing, at the moment of verification of identity for permission for a approaching vehicle to enter a protected ground, airspace and/or sea limit, positive identification of the driver/pilot/captain and the degree of the threat that said vehicle, aircraft or sea-going vessel presents.

BRIEF DESCRIPTION OF THE DRAWING

The invention will now be described in connection with certain preferred embodiments, with reference to the following illustrative FIGURE, so that it may be more fully understood.

With specific reference now to the FIGURE in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawing:

FIG. 1 is a flow chart illustrating the identification, according to the present invention, of the situation of a threat to a protected ground, airspace and/or sea limits by an approaching ground vehicle, aircraft or sea-going vessel.

DETAILED DESCRIPTION OF PREFERRED EMBODIMENTS

The method according to the present invention for identifying, at the moment of verification, the situation of a threat to a protected ground, airspace or sea limits by an approaching ground vehicle, aircraft or sea-going vessel, is applicable to both protected ground, air spaces and sea limits, with obvious variations to match the different situations. The method is based on the use of a smart card, per-se known in its basic form. Such cards generate and display a unique, one-time code produced by an algorithm, in combination with a specific encryption key. Augmented by an internal clock, the algorithm can generate a new code every predetermined period of time for the programmed life of the card. Only the associated software can determine which code is valid at a specific instance, for each of a group of issued cards. Some such cards also have audio outputs in addition to the visual display of the generated changing codes.

While, as discussed hereinbefore, the invention is applicable to ground, air and sea security systems, the following embodiment will relate to aviation, as the method according to the present invention is envisioned to be more widely used for air security.

According to the invention, smart cards will be distributed, e.g., by an air control center (ACC) to any pilot, i.e., pilots who are employees of regular commercial air carriers, private pilots, pilots for private companies and institutions and military pilots. Each smart card carries a unique readable card number, which number is registered at the ACC together with other identification information concerning the holder of the specific card, for example, the name and address of the holder; name of the holder's employer, e.g., the name of the airline; ordinary assigned route of travel, and the like. Other types of information, which is personally known only to the pilot, may also be recorded at the ACC for extra identification verification of the pilot possessing that specific smart card. Such information may be utilized in cases of doubt.

In addition to the above background data concerning the holder of a specific numbered smart card, the pilot enters two distinct personal identification number (PIN) codes into the card: a first code, representing a first state or situation in which the pilot and/or the aircraft is not under any threat; and a second code, representing a second state or situation in which the pilot and/or the aircraft is under a threat or constitutes a threat. These two, unique, secret codes are remembered by the pilot. When one of these codes is entered into the smart card, the latter will generate a display of numbers and/or letters which will then be transmitted, by any known means, to the ACC, to be decoded to determine the degree of threat presented by the aircraft.

The algorithm clocks of the smart card and of the ACC are synchronized at all times. As stated above, since the encoding of the PIN codes is time-based, so is the decoding. Thus, a further degree of security can be obtained by the ACC in determining that the approximate time that the PIN code was entered into the smart card by the driver/pilot/captain and the one-time-only code sent to the control center, corresponds to the time that the one-time-only code was received and decoded.

Obviously, the two secret PIN codes could remain in force for a predetermined period of time and be changed periodically, or they could be entered into the system before every flight, as a prerequisite for obtaining flight permission.

Upon the arrival of the aircraft at the identification point (box 2), e.g., 120 or 180 miles from destination, the ACC controller calls the aircraft for identification (box 4). The pilot transmits the smart card number and a one-time-only code instantly generated by the smart card and advantageously displayed on the card, to the ACC (box 6) and the latter enters it into the secured code system (SCS) (box 8). The SCS verifies the identification code (box 10). If verified (box 12), the pilot is given permission to enter the flight information region (FIR)(box 14), however, if the SCS determines a threat, FIR entrance is not given (box 16). A flight information region (FIR) is an aviation term used to describe airspace with specific dimensions, in which a flight information service and an alerting service are provided. In case of doubt, or for further verification, the SCS controller may request that the pilot provide further personal verification details, as described above (box 18).

Communication between the pilot in the aircraft and the ACC is advantageously effected by audio transmission, preferably by the pilot's voice reading the displayed indicia, i.e., numbers, letters and/or symbols into the microphone. Alternatively, the displayed one-time-only code is "read" automatically by the smart card incorporating audio output into the microphone.

According to a further embodiment of the invention, when a higher level of security is required, the smart cards may possess a biometric capability whereby the actuation thereof is possible only if it will identify a biometric feature of the holder, e.g., the holder's fingerprint and/or voice.

It can thus be realized that the above-described method not only discreetly informs the ACC of the state of threat of the aircraft, but it also verifies the situation by positively identifying the pilot possessing the smart card which generates the one-time-only code.

It will be evident to those skilled in the art that the invention is not limited to the details of the foregoing illustrated embodiments and that the present invention may be embodied in other specific forms without departing from the essential attributes thereof The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method for identifying, at the moment of verification of identity for permission to enter a protected ground, airspace and/or sea limit, the situation of a threat to the protected ground, airspace and/or sea limits by an approaching ground vehicle, aircraft or sea-going vessel, the method using a smart card having a clock that is time-synchronized with a clock in a control center, said method comprising:

having an authorized driver/pilot/captain select between first and second different secret PIN codes that are encoded in a smart card and uniquely identify the authorized driver/pilot/captain, said first PIN code representing a first state in which the vehicle, aircraft or sea-going vessel is not considered to present a threat and said second PIN code representing a second state in which the vehicle, aircraft or sea-going vessel is considered to present a threat;

entering the selected one of the first or second PIN codes into the smart card;

encrypting the selected one of the first and second PIN codes in said smart card using the smart card clock to generate a time-based one-time-only code that is uniquely indicative of the selected PIN code at a specified instant of time;

conveying the one-time-only code to the control center; and decoding the time-based one-time-only code at the control center using the control center clock to determine which of the first or second PIN codes was entered;

whereby, upon said control center receiving the time-based one-time-only code, the control center obtains positive identification of the driver/pilot/captain and the degree of the threat that said vehicle, aircraft or seagoing vessel presents.

2. The method as claimed in claim 1, wherein said driver/pilot/captain also transmits an identification number of the smart card to said control center.

3. The method as claimed in claim 1, including displaying the time-based one-time-only code on said smart card.

4. The method as claimed in claim 1, wherein said time-based one-time-only code is transmitted to said control center as an audio transmission.

5. The method as claimed in claim 4, wherein said time-based one-time-only code is displayed on the card and vocalized by the driver/pilot/captain into a common audio communication network.

6. The method as claimed in claim 4, wherein said time-based one-time-only code is audibly produced by the smart card.

7. The method as claimed in claim 1, wherein said smart card is provided with biometric capabilities for identifying the rightful holder of said card and allowing actuation only upon biometric identification of the holder by said card.

8. The method as claimed in claim 1, further comprising recording at the control center personal verification details of the driver/pilot/captain.

9. The method as claimed in claim 8, further comprising the control center requesting the driver/pilot/captain to provide personal verification details and comparing the provided details with the recorded details.

10. The method as claimed in any one of clams 1 to 9, further comprising periodically changing the PIN codes so as to enhance security.

* * * * *